United States Patent [19]
Keenan et al.

[11] Patent Number: 6,156,367
[45] Date of Patent: Dec. 5, 2000

[54] METHOD FOR THE PREPARATION OF A FOODSTUFF

[75] Inventors: Robert Daniel Keenan; Loyd Wix, both of Rushden; David Young, Earls Barton, all of United Kingdom

[73] Assignee: Good Humor-Breyers Ice Cream, division of Conopco, Inc., Green Bay, Wis.

[21] Appl. No.: 08/958,898

[22] Filed: Oct. 28, 1997

[30] Foreign Application Priority Data

Oct. 29, 1996 [EP] European Pat. Off. .............. 96307808

[51] Int. Cl.$^7$ ................................ A23L 1/04; A23C 21/00
[52] U.S. Cl. .................................... 426/565; 426/573
[58] Field of Search ........................... 426/565, 573, 426/522, 524

[56] References Cited

U.S. PATENT DOCUMENTS

| | | | |
|---|---|---|---|
| 3,900,577 | 8/1975 | Haas | 426/312 |
| 3,914,440 | 10/1975 | Witzig | 426/164 |
| 3,962,416 | 6/1976 | Katzen | 424/19 |
| 4,232,047 | 11/1980 | Sair et al. | 426/96 |
| 4,251,562 | 2/1981 | Le Grand et al. | 426/573 |
| 4,438,147 | 3/1984 | Hedrick | 426/570 |
| 5,051,304 | 9/1991 | David et al. | 428/402.2 |
| 5,100,688 | 3/1992 | Cox et al. | 426/573 |
| 5,104,674 | 4/1992 | Chen et al. | 426/573 |
| 5,173,322 | 12/1992 | Melachouris et al. | 426/580 |
| 5,208,050 | 5/1993 | Ney | 425/202 |
| 5,215,776 | 6/1993 | Peterson | 426/564 |
| 5,217,741 | 6/1993 | Kawachi et al. | 426/573 |
| 5,221,504 | 6/1993 | Capelle | 264/211.23 |
| 5,228,394 | 7/1993 | Kanda et al. | 99/453 |
| 5,271,881 | 12/1993 | Redding, Jr. | 264/432 |
| 5,410,010 | 4/1995 | Janda et al. | 427/213.31 |
| 5,439,703 | 8/1995 | Kanda et al. | 426/665 |
| 5,486,372 | 1/1996 | Martin et al. | 426/565 |
| 5,532,160 | 7/1996 | Watanabe et al. | 435/252.1 |
| 5,536,514 | 7/1996 | Bishay et al. | 426/103 |
| 5,601,760 | 2/1997 | Rosenberg | 264/4.1 |
| 5,620,729 | 4/1997 | Watanabe et al. | 426/327 |
| 5,843,334 | 12/1998 | Saheki et al. | 252/314 |
| 5,932,272 | 8/1999 | Raemy et al. | 426/573 |

FOREIGN PATENT DOCUMENTS

| | | |
|---|---|---|
| 454 268 | 10/1991 | European Pat. Off. . |
| 480 422 | 4/1992 | European Pat. Off. . |
| 600 670 | 6/1994 | European Pat. Off. . |
| 623 353 | 11/1994 | European Pat. Off. . |
| 2 675 544 | 10/1992 | France . |
| 2 690 854 | 11/1993 | France . |
| 2 730 412 | 8/1996 | France . |
| 34 18 400 | 11/1984 | Germany . |
| 42 26 255 | 2/1994 | Germany . |
| 5-339299 | 12/1993 | Japan . |
| 6-86646 | 3/1994 | Japan . |
| 94 21145 | 9/1994 | WIPO . |
| 94 28745 | 12/1994 | WIPO . |

OTHER PUBLICATIONS

Perry's Chemical Engineer's Handbook, 3rd Ed., McGraw–Hill Book Co., NY, NY pp. 5–6, 5–9, 1973.

Byrne, M., "The Heat is Off", Food Engineering International, pp. 34–38 (1993).

Van Camp, J., et al, "A Comparative Rheological Study of Heat and High Pressure Induced Whey Protein Gels", Food Chemistry 54(4) pp. 357–364, (1995).

Okamoto, M et al., "Application of High Processing: Textural Comparison of Pressure–and Heat–induced Gels of Food Proteins",(1990) Agric Biol Chem 54(1) pp. 183–189.

Mertens, B. A. A., "Toepassing van Hoge Isostatische Druk", Voedingsmiddelentechnologie, vol. 21, No. 24, pp. 11–14, (1991).

Haykawa et al., "Application of High Pressure for Spore Inactivation and Protein Denaturation", Journal of Food Science, vol. 59, No. 1, pp. 159–163 (1994).

Derwent Abstract of Japanese Patent JP 1171553.

*Primary Examiner*—Cynthia L. Nessler
*Attorney, Agent, or Firm*—James J. Farrell

[57] ABSTRACT

A process for the preparation of an ice confection having an aqueous phase and a fat phase, wherein the ice confection is subjected to an ultra high pressure treatment, the ice confection comprising in the aqueous phase at least 1 wt % micellar casein and sufficient total sugars such that a protein gel is formed on application of the ultra high pressure, providing that if micellar casein is present in the aqueous phase at less than 2 wt %, the ice confection composition includes a stabilizer.

13 Claims, 2 Drawing Sheets

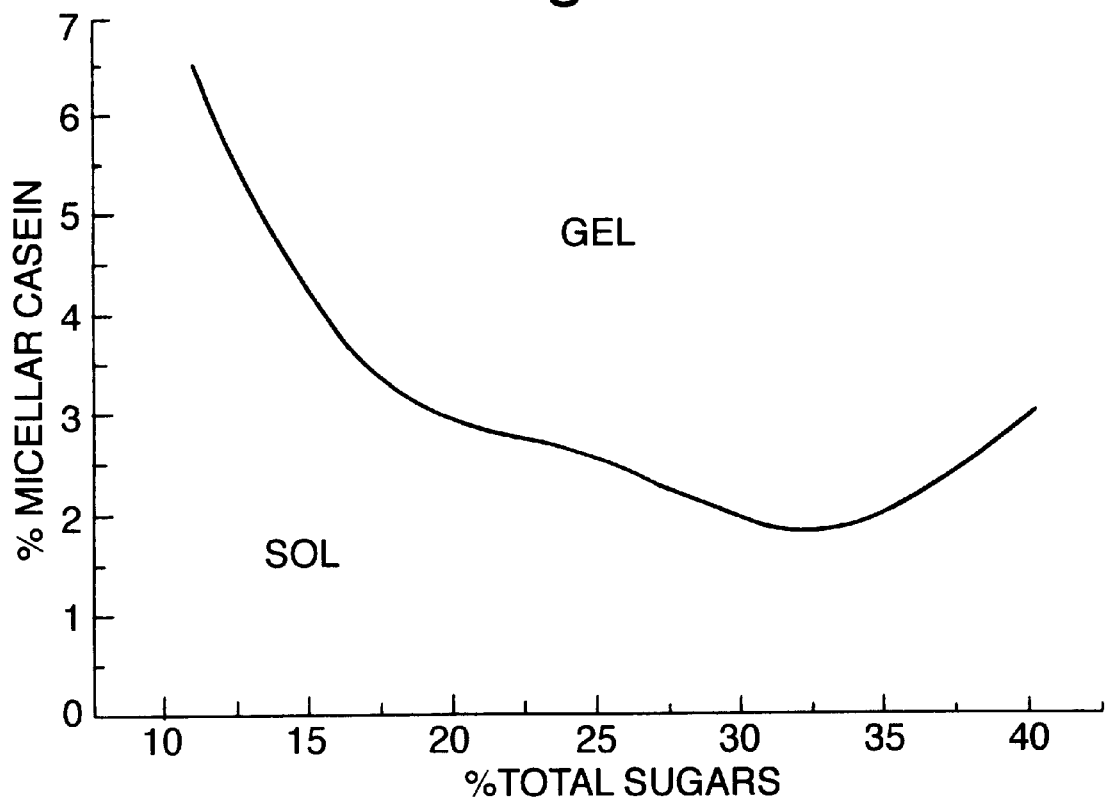

METHOD FOR THE PREPARATION OF A FOODSTUFF

TECHNICAL FIELD OF THE INVENTION

The invention relates to a method of preparation of an ice confection such as ice cream, wherein the ice confection is subjected to an ultra high pressure treatment.

BACKGROUND OF THE INVENTION

Ultra high pressure (UHP) is a known method for killing spores and has been suggested as a suitable route to food product pasteurisation. In Japan a range of pressure decontaminated products such as jellies, preserves, purees and sauces have been launched on the market (Byrne, M. (1993) Food Engineering International, 34–38).

Furthermore isolated, native proteins have been subjected to UHP. These proteins are in their native form, they have not been treated chemically or thermally before the pressure treatment by methods which significantly modify their protein structure (van Camp, J; Huyghebaert, A (1995) Food Chemistry 54(4) 357–364; Okamoto, M; Kawamura, Y; Hayashi, R; (1990) Agric Biol Chem 54(1) 183–189). It is generally believed that there would be no advantage in subjecting proteins which have already been substantially denatured by for example an initial heat-treatment prior to UHP.

DE 42 26 255 discloses the treatment of cream with ultra high pressure in order to crystallise the fat.

Surprisingly, we have noted that when an ice confection having an aqueous phase and a fat phase, such as ice cream, frozen yoghurt and the like, is subjected to UHP a number of advantages are achieved, providing that the micellar casein protein content and the total sugar content present in the aqueous phase of the ice confection are within specified limits. Further these advantages are achieved even if the product has been heat treated prior to UHP treatment.

DISCLOSURE OF THE INVENTION

Accordingly the invention provides a process for the preparation of an ice confection having an aqueous phase and a fat phase, wherein the ice confection is subjected to an ultra high pressure treatment, the ice confection comprising in the aqueous phase at least 1 wt % micellar casein and sufficient total sugars such that a protein gel is formed on application of the ultra high pressure, providing that if micellar casein is present in the aqueous phase at less than 2 wt %, the ice confection composition includes a stabiliser. The ice confection is not subjected to a freeze concentration step prior to the ultra high pressure treatment.

Preferably the aqueous phase comprises at least 2 wt % micellar casein.

By the term micellar casein it is meant casein protein present in the form of supramolecular structures, consisting of aggregated proteins and minerals, dispersed in the aqueous phase of the ice confection. These structures could have been formed naturally, ie native casein micelles as are present in milk, or may have been formed synthetically, such as those produced by the addition of certain minerals (eg $Ca^{2+}$) to casein.

Ice confections such as ice cream are usually produced by a continuous process comprising the following steps:

(a) homogenisation of the ingredients
(b) pasteurisation
(c) cooling
(d) freezing and aeration
(e) extrusion; and
(f) optionally deep freezing.

The applicants have surprisingly found that if the ice confection is subjected to an ultra high pressure treatment after step (b) and prior to step (d) the resulting product has a number of advantages as follows;

(i) the meltdown rate is decreased
 (ii) the product provided is perceived to be thicker, smoother and creamier and is less cold to eat;

Furthermore a particular advantage of such products is that they may be prepared in the absence of emulsifiers and/or stabilisers and/or have a zero or low fat content and/or a low milk content and yet retain high quality. With the proviso that at micellar casein levels of less than 2 wt % in the aqueous phase, stabiliser must be present.

Usually the protein content of the product will have been de-natured to some extent by the processing of the product prior to the application of the ultra high pressure treatment.

Optionally the conventional pasteurisation step (step b) may be omitted for ice confections which are subjected to the ultra high pressure treatment of the invention. However it is preferred that a conventional pasteurisation step is conducted prior to the ultra high pressure treatment. The ice confection is not subjected to a freeze concentration step prior to the ultra high pressure treatment.

The pressure during the ultra high pressure treatment is typically greater than or equal to 250 MPa, preferably approximately 400 MPa. The foodstuff is subjected to this pressure for typically greater than or equal to 1 minute, preferably from 1 to 80 minutes, most preferably from 5 to 40 minutes.

The ultra high pressure may be applied using any suitable apparatus. The process may be a batch process, a semi-continuous process, or preferably a continuous process.

The improved meltdown stability and sensory attributes of ice confections made from UHP treated premixes are believed to result from the formation of UHP-induced protein gels. In order to achieve the required protein gel on the application of the UHP a minimum content of total sugars has been found to be required within the aqueous phase of the ice confection. This can be better illustrated in Example 8 below where a state diagram is provided for systems treated at an ultra high pressure of 400 MPa for 20 minutes. Essentially the lower the micellar casein content in the aqueous phase the higher the total sugar content in the aqueous phase has to be. Thus at a micellar casein content in the aqueous phase of 2 wt % a total sugar content of at least 30 wt % is required. At a micellar casein content in the aqueous phase of 3 wt % a total sugar content of at least 20 wt % is required. At a micellar casein content in the aqueous phase of 4 wt % a total sugar content of at least 15 wt % is required. At a micellar casein content in the aqueous phase of 5 wt % a total sugar content of at least 13 wt % is required.

Preferably the micellar casein content in the aqueous phase is from 3 to 5 wt %. Preferably the total sugar content in the aqueous phase is approximately 25 wt %.

The sugar content can be selected from monosaccharides, disaccharides, oligosaccharides and mixtures thereof. Suitable examples include sucrose, fructose, lactose, glucose and corn syrups.

D G Schmidt and W Buchheim in Milchwissenschaft 25, 596 (1970) showed that pressure causes the irreversible fragmentation of casein micelles in milk, probably through pressure-induced dissolution of micellar calcium phosphate. However, we now believe that if this pressure induced fragmentation occurs in the presence of certain cosolutes (sugars) a network is formed from these fragments. This re-aggregation of the casein fragments may occur on decompression of the milk/sugar mixture. Examination of pressure-treated milk/sugar mixtures by transmission electron microscopy reveals that the gels are made from a particle network, the size of the individual particles being approximately an order of magnitude smaller than the casein micelles present in untreated mixtures. Therefore pressure treatment in the presence of appropriate levels of sugars provides a method of gelling casein at natural pH, room temperature and in the absence of coagulating enzymes.

BRIEF DESCRIPTION OF THE DRAWINGS

FIG. 2 shows the variation of a protein sol and a protein gel as a function of % Micellar Casein and % of total sugars.

EXAMPLES

Examples 1 to 3

Figure 1:
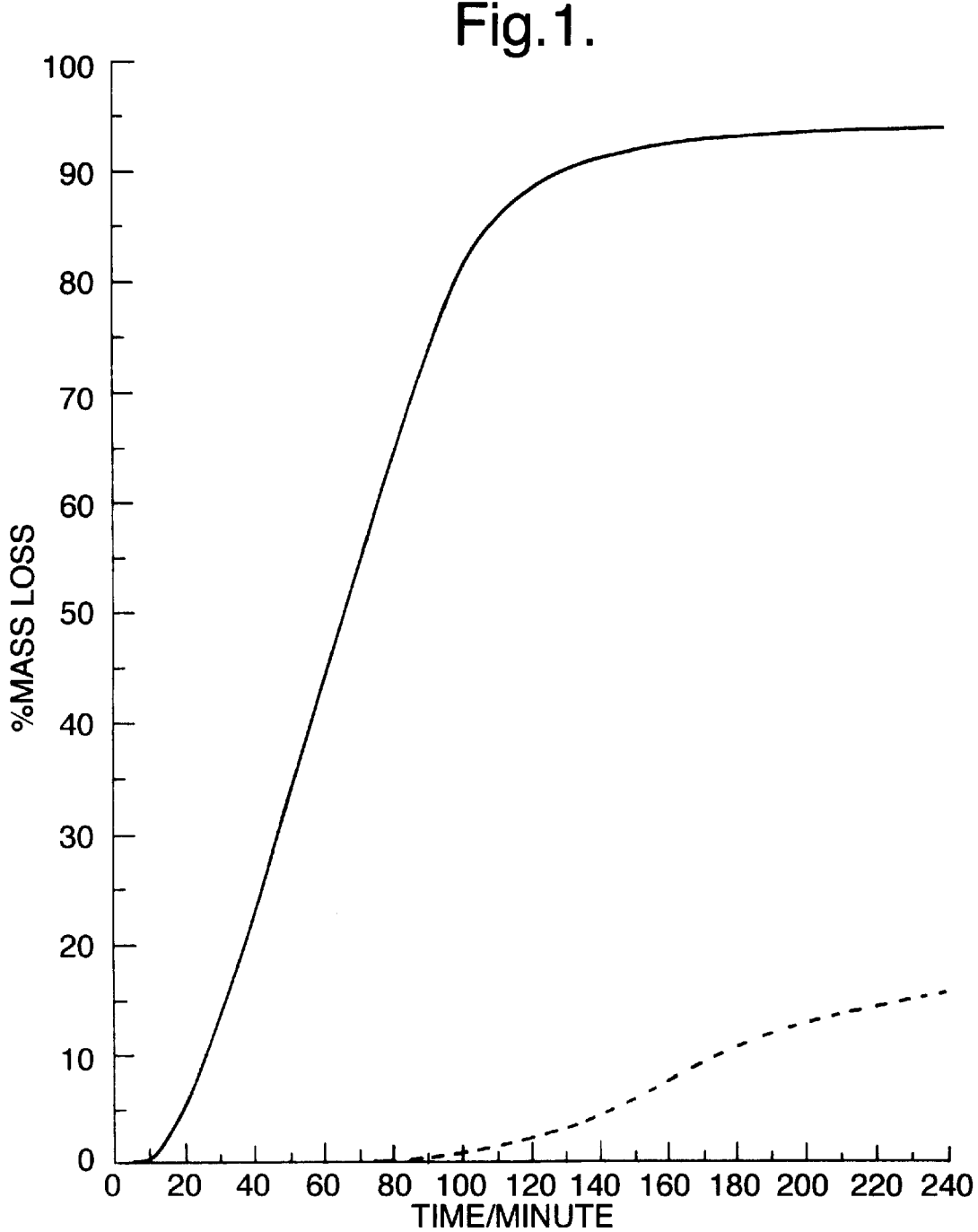
FIG. 1 shows Mass loss over time

An ice cream mixture having the following formulation
12.1% skimmed milk powder
25% dairy cream
15.44% sucrose
0.4% vanilla flavour
water to 100%
was prepared and pasteurised in the conventional way. The product was then subjected to a high pressure treatment as follows Example 1—300 MPa for 40 min
Example 2—400 MPa for 5 min
Example 3—400 MPa for 40 min at ambient temperature in a National Forge Cold Isostatic Press. The products were then frozen in the conventional way in a standard ice cream freezer (scraped surface heat exchanger SSHE), extruded and deep frozen.

The percentage mass loss was determined at 37° C. after at least 2 weeks frozen storage by measuring the weight of melted ice cream every minute over the required time period which passed through a grid having 3 mm square holes and a 1 mm mesh. The mass loss after 2 hours at 37° C. was as follows;

Example 1—3%
Example 2—4%
Example 3—3%

FIG. 1 shows the results of the percentage mass loss measurements. The mass loss of the ice cream composition prepared in Example 3 is shown by ----. This is compared to a control (—) which is the same ice cream composition prepared as in Example 3 except that the ice cream composition is not subjected to an ultra high pressure treatment.

The percentage destabilised fat was measured using a solvent extraction technique. 10 g log of ice cream was melted for 4 hours at ambient temperature before extraction with petroleum solvent. The solvent was evaporated and the extracted destabilised fat was weighed, this was expressed as a percent of the weight of the total fat in the ice cream.

Accordingly the percentage destabilised fat was measured to be 0.3%.

These results show that the gel has not been formed by a fat network.

Further the prepared ice cream of Example 3 was tested by a trained sensory panel and found to be firmer, chewier, smoother, less icy, creamier, thicker and less cold than Comparative Example A.

Comparative Example A

An ice cream was prepared as in Example 1 above except that the ice cream pre-mix was not subjected to any UHP treatment.

Mass loss was measured as in Example 1. The mass loss after 2 hours at 37° C. was 88%.

Example 4

Example 3 was repeated except that after pasteurisation the product was subjected to a heat treatment at 140° C. for 5 seconds before the high pressure treatment.

Mass loss was measured as in Example 1. The mass loss after 2 hours at 37° C. was 41%.

Example 5

An ice cream mixture having the following formulation
14.4% skimmed milk powder
0.5% butter fat
17.6% sucrose
0.4% vanilla flavour
water to 100%
was prepared and pasteurised in the conventional way. The product was then subjected to a high pressure treatment at 400 MPa for 40 min at ambient temperature in a National Forge Cold Isostatic Press. The product was then frozen in the conventional way in a standard ice cream freezer (scraped surface heat exchanger SSHE), extruded and deep frozen.

Mass loss was measured as in Example 1. The mass loss after 2 hours at 37° C. was 43%.

Further the prepared ice cream was tested by a trained sensory panel and found to be firmer, chewier, smoother, less icy, creamier and thicker than Comparative Example B.

Comparative Example B

An ice cream was prepared as in Example 5 above except that the ice cream pre-mix was not subjected to any UHP treatment.

Mass loss was measured as in Example 1. The mass loss after 2 hours at 37° C. was 98%.

Example 6

An ice cream mixture having the following formulation
9.1% skimmed milk powder
25% dairy cream
15.44% sucrose
0.4% vanilla flavour
water to 100%
was prepared and pasteurised in the conventional way. The product was then subjected to a high pressure treatment at 400 MPa for 40 min at ambient temperature in a National Forge Cold Isostatic Press. The product was then frozen in the conventional way in a standard ice cream freezer (scraped surface heat exchanger SSHE), extruded and deep frozen.

Mass loss was measured as in Example 1. The mass loss after 2 hours at 37° C. was 12%.

Further the prepared ice cream was tested by a trained sensory panel and found to be less icy, creamier and thicker than Comparative Example C.

Comparative Example C

An ice cream was prepared as in Example 6 above except that the ice cream pre-mix was not subjected to any UHP treatment.

Mass loss was measured as in Example 1. The mass loss after 2 hours at 37° C. was 94%.

Example 7

An ice cream mixture having the following formulation
10% skimmed milk powder
8% butteroil
13% sucrose
4% corn syrup
0.144% Locust Bean Gum
0.016% Carageenan
0.3% mono/di glyceride
0.012% vanillin
water to 100% was prepared and pasteurised in the conventional way. The product was then subjected to a high pressure treatment at 400 MPa for 40 min at ambient temperature in a National Forge Cold Isostatic Press. The product was then frozen in the conventional way in a standard ice cream freezer (scraped surface heat exchanger SSHE), extruded and deep frozen.

Mass loss was measured as in Example 1. The mass loss after 2 hours at 37° C. was 8%.

Further the prepared ice cream was tested by a trained sensory panel and found to be firmer and creamier than Comparative Example D.

Comparative Example D

An ice cream was prepared as in Example 7 above except that the ice cream pre-mix was not subjected to any UHP treatment.

Mass loss was measured as in Example 1. The mass loss after 2 hours at 37° C. was 52%.

Example 8

A series of samples containing different amounts of sugars and micellar casein were prepared by dispersing skim milk powder (SMP), sucrose and/or lactose into water at room temperature. These samples had levels of micellar casein in the range 0–12% (w/w) and sugars in the range 5–50%. The final concentrations were calculated assuming that SMP contains approximately 50% lactose and 30% micellar casein.

Samples were sealed in 5 ml plastic bags and compressed at 400 MPa for 20 min using a cold isostatic press (Stansted Fluid Power, Stansted, UK) operating at room temperature. The press had a sample volume of 30 ml and the pressure-transmitting fluid was methanol. After decompression samples were stored at 5° C. for 3 days prior to rheometric analysis.

In order to determine which samples had been gelled by the high pressure treatment, oscillatory rheometry was performed on both the pressure-treated samples and untreated controls. The rheological tests were performed at 5° C. on a Carrimed CSL500 rheometer operating in oscillatory mode with a cone-and-plate geometry. A 6 cm diameter acrylic cone with a gap of 53 $\mu$m, operating at a stress of 1 Pa and a strain of 0.005, was used. Samples were considered to be gelled if the measured storage modulus (G') was greater than the loss modulus (G") at a frequency of 1 Hz.

In all cases the untreated samples were liquids. FIG. 2 shows the state diagram for systems treated at 400 MPa for 20 min. Samples with compositions above the line were found to be gelled (according to the criteria given above) while those below the line were liquids after pressure treatment.

What is claimed is:

1. A process for the preparation of an ice confection having an aqueous phase and a fat phase, wherein the ice confection is subjected to an ultra high pressure treatment, the ice confection comprising in the aqueous phase at least 1 wt % micellar casein and sufficient total sugars such that a protein gel is formed on application of the ultra high pressure, providing that the ice confection is not subjected to a freeze concentration step prior to the ultra high pressure treatment and if micellar casein is present in the aqueous phase at less than 2 wt %, the ice confection composition includes a stabilizer.

2. A process according to claim 1 wherein the ice confection comprises at least 2 wt % micellar casein in the aqueous phase.

3. A process according to claim 1 wherein the ice confection comprises from 3 to 5 wt % micellar casein in the aqueous phase.

4. A process according to claim 3 wherein the ice confection comprises approximately 25 wt % total sugars.

5. A process according to claim 1 wherein the pressure during the ultra high pressure treatment is greater than or equal to 250 MPa.

6. A process according to claim 1 wherein the pressure during the ultra high pressure treatment is approximately 400 MPa.

7. A process according to claim 1 wherein the foodstuff is subjected to high pressure for greater than or equal to 1 minute.

8. A process according to claim 1 wherein the foodstuff is subjected to ultra high pressure for from 1 to 80 minutes.

9. A process according to claim 1 wherein the foodstuff is subjected to ultra high pressure for from 5 to 40 minutes.

10. A process according to claim 1 wherein the ice confection has a zero or low fat content.

11. A process according to claim 1, wherein the ice confection is subjected to a pasteurization step prior to the ultra high pressure treatment.

12. A process according to claim 1, wherein the ice confection comprises in the aqueous phase at least 2 wt % micellar casein and sufficient total sugars such that a protein gel is formed on application of the ultra high pressure, the ice confection composition having no added stabilizer.

13. A process according to claim 12, wherein the ice confection contains no added emulsifiers.

* * * * *